United States Patent [19]

O'Neil

[11] 4,072,927

[45] Feb. 7, 1978

[54] TIRE PRESSURE MONITOR
[75] Inventor: Walter K. O'Neil, Southfield, Mich.
[73] Assignee: Eaton Corporation, Cleveland, Ohio
[21] Appl. No.: 768,810
[22] Filed: Feb. 15, 1977
[51] Int. Cl.² ............................................. B60C 23/02
[52] U.S. Cl. .................................. 340/58; 340/253 Y
[58] Field of Search .................... 340/58, 258 C, 259, 340/253 Y; 73/146.5; 200/61.22, 61.25

[56] References Cited
U.S. PATENT DOCUMENTS
2,894,246   7/1959   De Graffenried ................. 340/58 X Primary Examiner—Alvin H. Waring
Attorney, Agent, or Firm—Teagno & Toddy

[57] ABSTRACT

Low pressure in a vehicle tire is detected by a system including an electronic circuit which activates a warning light in response to momentary phase shift between two cyclic signals. The system includes an oscillator which produces the first of the two cyclic signals, a parallel resonant circuit excited by the first signal and producing the second of the two cyclic signals, a coil mounted to rotate with the tire and to pass through an electromagnetic field produced by an inductor in the resonant circuit and operative to momentarily shift the phase of the second signal relative to the phase of the first signal when a pressure operated switch in the tire closes and shorts the coil, a detector which produces an output signal that momentarily changes in response to the momentary phase shift, and a warning light that is activated in response to the momentary change in the output signal.

10 Claims, 3 Drawing Figures

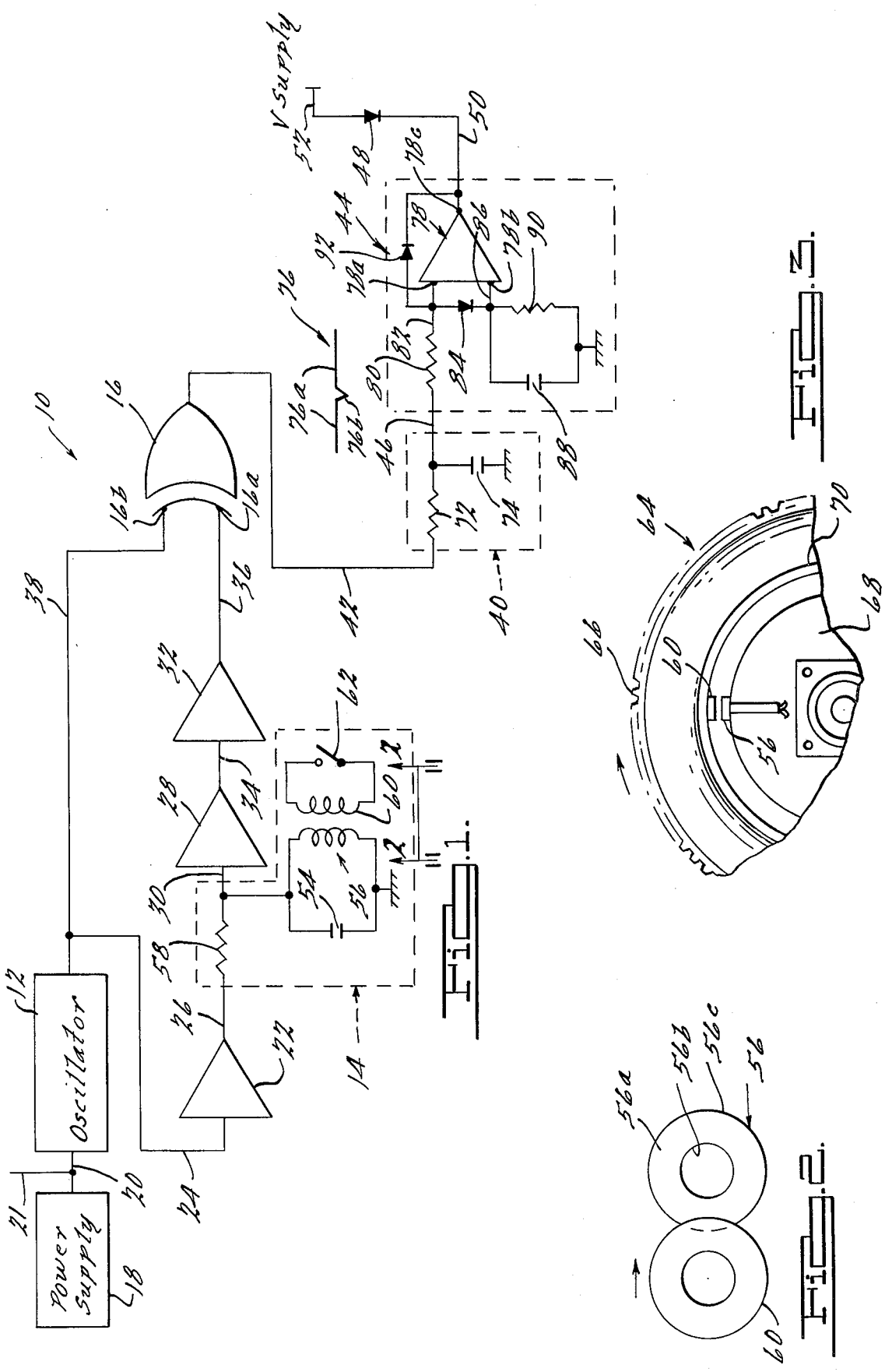

TIRE PRESSURE MONITOR

BACKGROUND OF THE INVENTION

1. Field of the Invention

The invention relates to an electronic circuit for detecting a phase shift between two cyclic signals and more specifically to such a circuit for monitoring the condition of a pneumatic tire of a vehicle.

2. Description of the Prior Art

The many undesirable effects of low tire pressure are well known and many systems have been devised to warn a vehicle operator of low pressure conditions. Several prior art systems employ the phenomenon of induction to provide a signal which indicates a low tire pressure condition. In one such system, a magnet is mounted on a stationary part of the vehicle; the magnet is moved by a pressure responsive mechanism into a position for inducing a signal into the coil when the tire pressure decreases; and an electronic circuit senses the induced signal and activates a warning light. However, this system requires a relatively expensive mechanism to move the magnet and is susceptible to jamming due to the severe environmental conditions. In another such system, two annular coils are mounted on a stationary part of a vehicle and inductively separated by an annular coil concentrically mounted around the entire periphery of a wheel; the wheel mounted coil inductively couples the two stationary coils together in response to closing of a tire pressure operated switch and thereby sets off an oscillator which activates a warning device. This system is also relatively expensive due to the size of the coils, and is vulnerable to spurious signals that could set off the oscillator.

SUMMARY OF THE INVENTION

One object of the invention is to provide an inexpensive and reliable system for detecting a change in condition of an object and having a circuit which is insensitive to spurious signals.

Another object of the invention is to provide such a system suitable for use as a tire pressure monitor.

The objects are realized by an electronic circuit including an oscillator producing a first cyclic signal, a resonant circuit producing a second cyclic signal which is shiftable in phase relative to the first signal in respone to a change in condition of the object, and a phase shift detector for activating a warning device in response to the phase shift.

BRIEF DESCRIPTION OF THE DRAWING

The preferred embodiments of the invention are shown in the accompanying drawing in which:

FIG. 1 is a generalized illustration of an electronic system for detecting a change in condition of an object;

FIG. 2 is an example of the coils that may be used in the system of FIG. 1; and

FIG. 3 illustrates the mounting of the coils of FIG. 2 when the system is used as a tire pressure monitor.

DETAILED DESCRIPTION OF THE DRAWING

Referring now to FIG. 1, therein is shown a generalized illustration of an electronic system or circuit 10 which detects a difference in phase between two cyclic signals and produces an output signal representative of the difference in phase between the two signals. The first of the two cyclic signals is produced by an oscillator 12, and the second is produced by a resonant circuit 14 which is excited by the first signal. The phase of the second signal is shifted relative to the phase of the first signal by changing the impedance of the resonant circuit. A phase shift detector or gate 16 produces a cyclic output signal having a duty cycle representative of the difference in phase between the two signals. Circuit 10, as disclosed herein, is operative to detect a change in condition of a vehicle tire; however, the circuit may be used to detect a change in condition of virtually any object and particularly an object that moves.

More specifically, circuit 10 includes a power supply 18 connected via a line 20 to oscillator 12 which produces a square wave signal, a line 21 for connecting the power supply to other components of circuit 10 in a well-known manner, a square wave buffer and drive 22 connected to the oscillator via a line 24 and operative to drive or excite the resonant circuit 14 via a line 26, an amplifier 28 connected to the resonant circuit via a line 30 and operative to amplify the second cyclic signal from the resonant circuit, a zero crossing detector and squarer 32 connected to the amplifier 28 via a line 34 and operative to square or reshape the second signal produced by the resonant circuit before it is applied to a terminal 16a of detector 16 via a line 36, a line 38 connecting the oscillator output directly to a reference terminal 16b of the detector, a smoothing circuit 40 connected to the output signal of the detector via a line 42, a floating input-negative pulse detector circuit 44 connected to the smoothing circuit via a line 46, a light emitting diode (LED) or warning light 48 connected to circuit 44 via a line 50, and a line 52 for connecting LED 48 to the power supply.

The power supply 18, oscillator 12, buffer and driver 22, amplifier 28, zero crossing detector and square 32, and detector 16 are all well known items or components that can be readily obtained and assembled by persons skilled in the electronic art. Oscillator 12 may comprise a 210 KHZ ceramic resonator and a dual D flip-flop to divide the frequency. Buffer and drive 22 may comprise an invertor and power transistors. Amplifier 28 may comprise an invertor. Zero crossing detector and squarer 32 may comprise a Schmitt Trigger. And detector 16 may comprise an exclusive-or gate.

Resonant circuit 14 includes capacitive and inductive reactive elements 54 and 56 which are excited by the signal on line 26 via a damping resistor 58. Resistor 58 allows the second signal or voltage signal resonating between the reactive elements to shift in phase relative to the reference voltage signal produced by the oscillator whenever the effective impedance of either or both of the reactive elements is changed. Herein, the reactive elements are connected in parallel; however, they may be connected in series.

Reactive element 54 is a capacitor, and inductor element 56 is an inductor coil. Lookig now at FIG. 2, coil 56 may comprise about 50 wraps of 25 gauge copper wire (not shown) wound on a spool or bobbin 56a having an I.D. 56b of about 0.375 inches, an O.D. 56c of about 0.800 inches, and a thickness (not shown in FIG. 2) of about 0.125 inches. Coil 56 produces, in a well known manner, an electromagnetic field composed of lines of induction extending substantially parallel to the axis of the bobbin.

The effective impedance of coil 56, and hence the effective impedance of the resonant circuit, is changed by a coil 60 when the contacts of a switch 62 close and electrically connect or short the ends of the coil wire together. Coil 60 may be wound of ferrous or nonferrous wire; herein, copper wire is used. Further, coil 60 may be replaced by any metallic material or magnetic material, in which case switch 62 would be dispensed with and the material would be moved into or out of the electromagnetic field in response to changes in condition of an object. Coil 60 may be permanently disposed in the electromagnetic field of coil 56, or, as shown in FIGS. 2 and 3, may be moved through the field. Coil 60 may be made the same as coil 56. When switch 62 is open, the presence of or movement of coil 60 through the field has substantially no effect on the effective impedance of coil 56. When the switch is closed, the lines of induction cut by coil 60 cause a current to be induced into coil 60, thereby changing the effective impedance of coil 56 and shifting phase of the voltage signal produced by the resonant circuit.

Looking now at FIG. 3, therein is shown coils 56 and 60 mounted on a vehicle wheel assembly 64 for detecting a change in pressure of a pneumatic tire 66. Coil 56 is fixed to a nonrotating part 68 of the vehicle and connectable into the resonant circuit via the wires protruding downward therefrom. Coil 60 is fixed to a wheel rim 70 having the tire mounted thereon and electrically connected to switch 62 (not shown) mounted in the tire and controlled by a pressure operated device (not shown) which closes the switch contacts when the tire pressure falls a predetermined amount. Such pressure operated devices are well known in the prior art. Rotation of tire 66 causes coil 60 to move through the electromagnetic field of coil 56 without effecting the impedance of the resonant circuit, when the tire pressure is normal. When the pressure falls and the switch closes, the impedance will be momentarily changed and the phase of the resonant circuit signal will momentarily decrease relative to the phase of the reference signal on terminal 16b of the detector.

Returning now to FIG. 1, the values of capacitor 54, inductor 56, and resistor 58 may be selected so that the resonant circuit signal can lead, lag, or be in phase with the reference signal. Herein, the values are selected so that the resonant circuit signal lags the reference signal by 30 to 40° when the impedance of the resonant circuit is uneffected by coil 60. This phase difference decreases when coil 60 affects the impedance of coil 56.

Detector 16 is an exclusive-or gate which produces a cyclic output signal having a duty cycle portion representative of the difference in phase between the two signals on input terminals 16a and 16b. The width of the duty cycle portion decreases when the phase difference between two signals on the input terminals decreases. The gate switches high to the duty cycle portion of the output signal whenever one of the inputs is low and the other is high; i.e., the output is high during the out of phase portion of the signals. The gate switches low whenever both of the inputs are the same; i.e., the output is low during the in phase portion of the signals.

Smoothing circuit 40 includes a resistor 72 and a capacitor 74 which smoothes or averages out the voltage value of the duty cycle portion of the output signal. An oscilloscope trace 76 represents the output voltage of the smoothing circuit. The flat portion 76a represents the average value of the duty cycle portion when switch 62 is open or coil 60 is out of the electromagnetic field of coil 56. The negative going pulse 76b represents a momentary decrease in the phase difference between signals on terminals 16a and 16b and of course is caused by a closed switch 62 and movement of coil 60 through the electromagnetic field.

Circuit 44 includes a comparator 78 having input terminals 78a and 78b and an output terminal 78c connected to line 50. Terminal 78a is connected to output line 46 of the smoothing circuit 40 via a resistor 80 and a line 82. Terminal 78b is connected to line 82 via a diode 84 and a line 86, which line 86 is also connected to an RC circuit having a storage capacitor 88 and a bleed resistor 90. Diode 84 allows capacitor 88 to accumulate a floating reference charge from line 82 and blocks an abrupt discharge of the capacitor when the voltage from circuit 40 and on line 82 momentarily decreases. Hence, terminal 78b remains high and terminal 78a momentarily goes low in response to the negative going pulse from the smoothing circuit. This momentary condition switches the comparator from a high output impedance to a low output impedance, thereby providing a ground for the voltage on line 52 and illuminating warning light 48. The output of comparator 78 is clamped low by a diode 92, whereby light 48 remains illuminated.

The preferred embodiments of the invention have been disclosed for illustrative purposes. Many variations and modifications of the preferred embodiments are believed to be within the spirit of the invention. For instance, the smoothing circuit 40 and floating input-negative pulse detector 44 may be replaced by a circuit employing digital logic techniques to detect the phase shift change and activate the warning light. The following claims are intended to cover the inventive portions of the preferred embodiment and variations and modifications believed to be within the spirit of the invention.

What is claimed is:

1. A monitoring system for activating a warning device in response to a change in condition of an object, said system comprising:
    means for producing a first cyclic signal;
    a resonant circuit including reactive means, said resonant circuit excited by said first cyclic signal and operative to produce a second cyclic signal shiftable in phase relative to said first cyclic signal in response to changes in effective impedance of said resonant circuit;
    means associated with said reactive means and operative in response to said change in condition of said object to change the effective impedance of said resonant circuit and shift the phase of said second cyclic signal relative to said first cyclic signal; and
    detector means operative to produce an output signal representative of the difference in phase between said first and second cyclic signals and operative in response to a change in said output signal to activate said warning device.

2. The system of claim 1, wherein said reactive means includes an inductor operative to produce an electromagnetic field and wherein said associated means includes:
    switch means having an open position and a closed position and operative to switch from one of said positions to the other in response to said change in condition of said object; and
    a coil electrically connected to said switch means and operative when disposed in said electromagnetic field to cause said effective impedance change in response to switching of said switch means from one position to the other position.

3. A monitoring system for activating a warning device in response to a change in condition of a pneumatic tire mounted for rotation about an axis, said system comprising:

means for producing a first cyclic signal;

a resonant circuit including reactive means, said resonant circuit excited by said first cyclic signal and operative to produce a second cyclic signal shiftable in phase relative to said first cyclic signal in response to a change in condition of said pneumatic tire;

means for supporting said reactive element adjacent to said tire and stationary relative to said axis;

means mounted for rotation with said tire and operative in response to said change in condition of said object to change the effective impedance of said resonant circuit and shift the phase of said second cyclic signal relative to said first cyclic signal; and detector means operative to produce an output signal representative of the difference in phase between said first and second cyclic signals and operative in response to a change in said output signal to activate said warning device.

4. The system of claim 3, wherein said reactive means includes an inductor operative to produce an electromagnetic field and wherein said mounted means includes:

switch means having an open position and a closed position and operative to switch from one of said positions to the other in response to said change in condition of said tire; and a coil electrically connected to said switch means and operative when disposed in said electromagnetic field to cause said effective impedance change in response to switching of said switch means from one of said positions to the other.

5. The system of claim 3, wherein said reactive means includes an inductor operative to produce an electromagnetic field, and wherein said mounted means includes:

switch means having an open position and a closed position and operative to switch from one of said positions to the other in response to said change in condition of said tire; and a coil electrically connected to said switch means and disposed to pass through said electromagnetic field in response to rotation of said tire, said coil substantially ineffective to change the effective impedance of said resonant circuit when said switch is open and operative to momentarily change said effective impedance when in said field and when said switch is closed, whereby the phase of said second signal momentarily shifts and the output signal of said detector momentarily changes.

6. The system of claim 5, wherein said switch is normally open and is switched to said closed position in response to the pressure of said tire falling below a predetermined amount.

7. The system of claim 5, further including:

means operative to activate said warning device in response to said momentary change in said output signal.

8. A monitoring system for activating a warning device in response to a change in condition of a pneumatic tire mounted for rotation about an axis, said system comprising:

means for producing a first cyclic signal;

a resonant circuit excited by said first cyclic signal and including a capacitor connected in parallel with an inductor operative to produce an electromagnetic field, said resonant circuit operative to produce a second cyclic signal shiftable in phase relative to said first cyclic signal in response to changes in effective impedance of said resonant circuit;

means for supporting said inductor adjacent to said tire and stationary relative to said axis;

switch means having an open position and a closed position and operative to switch from one of said positions to the other in response to said change in condition of said tire;

a coil electrically connected to said switch means and disposed to pass through said field in response to rotation of said tire, said coil substantially inoperative to change the effective impedance of said resonant circuit when said switch is open, and said coil operative to momentarily change said effective impedance and momentarily shift the phase of said second cyclic signal when passing through said field and when said switch is closed;

detector means operative to produce an output signal which momentarily changes from a first value to a second value in response to said momentary phase shift of said second cyclic signal; and means operative in response to one of said values to activate said warning device.

9. The system of claim 8, wherein said switch closes in response to said change in condition of said tire and said operative means activates said warning device in response to said output signal momentarily changing to said second value.

10. The system of claim 8, wherein said output signal of said detector means is a cyclic output signal having a duty cycle portion which momentarily changes from said first value to said second value in response to said momentary phase shift, said system further including:

circuit means for smoothing said first value to a substantially noncyclic average value which momentarily changes in value in response to said first value momentarily changing to said second value.

* * * * *